June 22, 1948.　　　　H. R. SANDERS　　　　2,443,964
HYDRAULIC VALVE ASSEMBLY FOR MOTOR CONTROL
Filed July 21, 1944　　　　　　　　　　　　2 Sheets-Sheet 1

Herbert R. Sanders,
INVENTOR;
By his attorney,
Frederick E. Maynard

June 22, 1948.  H. R. SANDERS  2,443,964
HYDRAULIC VALVE ASSEMBLY FOR MOTOR CONTROL
Filed July 21, 1944  2 Sheets-Sheet 2
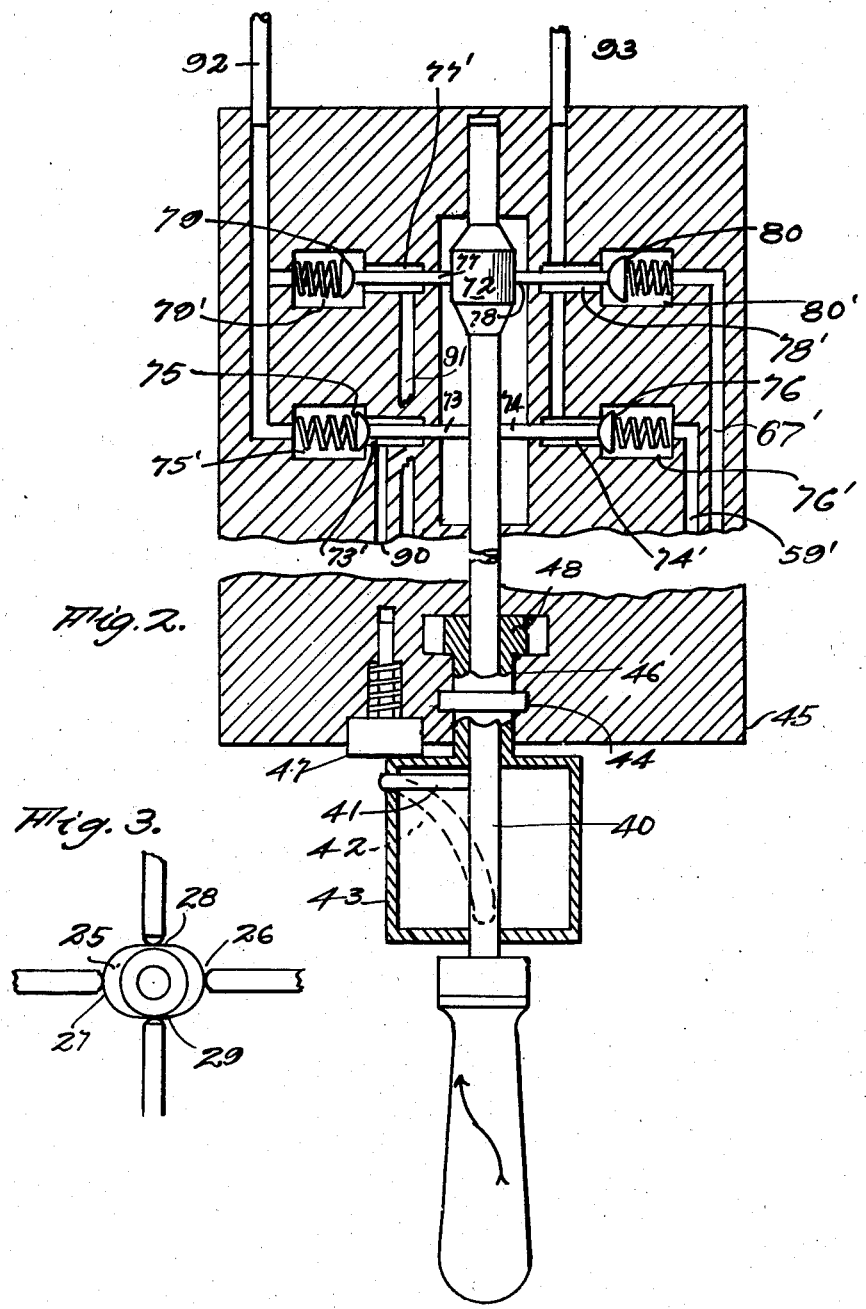
Herbert R. Sanders,
INVENTOR;
By his attorney,
Frederick E. Maynard Patented June 22, 1948

2,443,964

UNITED STATES PATENT OFFICE 2,443,964

HYDRAULIC VALVE ASSEMBLY FOR MOTOR CONTROL

Herbert R. Sanders, Los Angeles, Calif.

Application July 21, 1944, Serial No. 546,015

14 Claims. (Cl. 60—97)

This invention is a manually or otherwise controlled, semi-automatic, hydraulic, multi-assembly valve system.

Various, complex, combined link- or cable-train mechanisms have been proposed and some used for initiating and stopping operation of relative hydraulic motors; especially of the reciprocating piston type.

It is an object of this invention to provide a more reliable, much more simple, and less vulnerable valve system than afforded by the link or cable type controls.

A further object of the invention is to provide a control system, related to divers functions, by using hydraulic apparatus including a peculiar combination of selective, multiple feeder and exhaust valves for control of direction of motor drive, by motive liquid, junction service valves for power liquid delivery, a pressure operated, junction pressure and exhaust flow check valve means, and set of piston co-ordinating valves.

In addition, an object of the invention is to provide a hydraulic apparatus to feed motive liquid to one or more liquid pressure driven motors of desired type whereby to, from a near or remote station point and by manual or other control, initiate piston stroke or motion in one selected direction, and to step-by-step positively continue the initiated motion, or to, from any step, reverse the piston motion and continue its reverse motion step-by-step, within reciprocation limits, in case of reciprocating motors, or continuously when the apparatus is employed on a rotary piston prime mover.

It is also an object of the invention to provide means controlled by a given motor, in the combination, to cause cessation of motion at the end of each step for which the master control or piston service valve may have been hand or otherwise set.

A desired objective is to provide a unitary, hand valve device for initially selecting the direction of the motive liquid to the service system and concurrently the flow of exhaust liquid from the served motor or motors, as the case may be, for in one adjustment liquid tubes are used for pressure delivery and if reverse pressure adjustment is selected then the same tubes take up mere exhaust pressure, at least up to related junction control valves.

Another object of the invention is to provide a single spindle control whereby to first select a direction of flow of motive liquid and then to control step-by-step action of the related prime mover or movers in the selected direction, and at any time to elect a reverse flow and motor action.

The invention consists of certain advancements in this art as set forth in the ensuing disclosure and having, with the above, additional objects and advantages as will be made manifest in the following description of the herewith illustrative apparatus embodiment; it being understood that modifications, variations and adaptations may be resorted to within the scope, spirit and principle of the invention as it is more particularly claimed in the addendum.

Figure 2 is a detail, sectional view of the liquid direction control means.

Figure 3 is an end elevation of a double point, multi-poppet valve cam.

Figure 1:
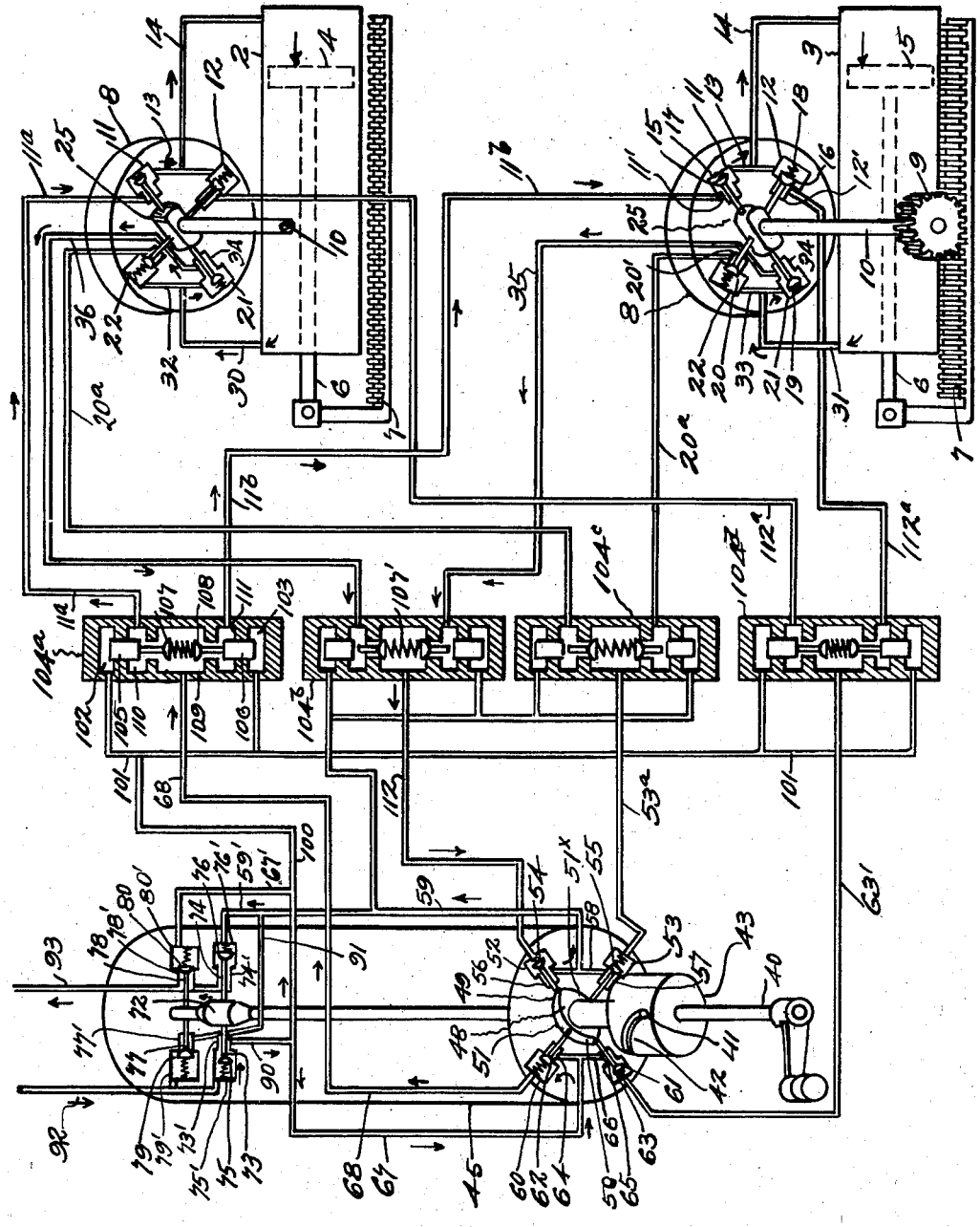
Figure 1 is a schematic diagram, partly in section, showing a multiple, hydraulic motor control.

In the illustrative disclosure two, like, reciprocating motor cylinders 2 and 3 have respective pistons 4 and 5 for operating piston rods 6—6 which are connected in any desired manner to structures, not shown, which are to be motivated and controlled by the motor pistons.

The rods 6—6 are also connected to relative gear racks 7—7 whereby to afford a positive means for controlled actuation of motor piston control valves operatively mounted in housings 8—8 fixedly associated with the motor cylinders 2—3. The racks 7—7 constantly engage related pinions 9 (one being omitted) which are fixed on shafts 10 extending from the housings 8—8, which are duplicate and contain duplicate sets of four valve chambers, a description of one of which will suffice for both.

Each of these sets contains at one side of the shaft 10 a pair of chambers 11 and 12 which are connected by a duct 13 in common to a power liquid flow tube 14 tapping into its relative cylinder 2 (3) to supply pressure at one end thereof for driving the piston 4 (5) and also, reversely, for timely exhausting the relative end of the cylinder. In these chambers work the heads of poppet valves 15 and 16 having light springs 17—18 tending to close the valves on seats at the ends of liquid pockets 11' and 12'.

The pocket 11', as to motor cylinder 2, is served by a two-way flow tube 11a and the pocket 11', as to cylinder 3 is served by a two-way flow tube 11b; the arrows of Fig. 1, showing pressure flow in these tubes for the purpose of driving the motor pistons 4—5 to the left, concurrently, and under an equal head of liquid pressure.

Since the pistons are double acting in operation another pair of spring closed, poppet valves 19 and 20 is provided to open into chambers 21 and 22;

all the poppet valves 15, 16, 19 and 20 being 90° apart in the same transverse plane in their housing 8.

In operation these cylinder related control valves may each operate as pressure feeders on, as exhausters in instants of motion under control of the relative pistons 4 and 5 according to direction of piston motion.

Means are provided whereby diametrically opposite poppet valves of the motors, in each set, are concurrently forced open against their springs (and possible fluid pressure) in such order that, a shown, opposite valves 15 and 19 are opened into their chambers and immediately thereafter the intra-angle valves 16 and 20 are freed to close by action of their springs and stop flow from their chambers into their pockets. In event that liquid pressure should be on both sides of a poppet valve (as will be at times) if the poppet is closed, as is poppet 16, and if pressure in pocket 12' is greater than pressure in chamber 12 then liquid pressure in pocket 12' may overcome liquid pressure in chamber 12 and spring 18 and flow from pocket 12' to chamber 12 in the flow cycle as to the motor unit 2 (3) and with pressure from the chamber 11 act on the motor, as determined by pipe friction in the circuit.

The valve timing and actuating means is here a double pointed cam 25 fixed on the shaft 10 (of each motor). This cam presents diametrically opposite high points 26—27, Fig. 3, and intermediate low faces 28—29; the points and the said faces being all 90° apart in a common plane around the shaft. Therefore, in Fig. 1, the cams 25, at one instant, are in the position shown as to the motors and liquid pressure is fed to the right end of the motors 2—3 whilst exhaust is flowed by way of liquid tubes 30 and 31 to respective housing ducts 32 and 33. Duct 32 of motor 2 serves both chambers 21 and 22, and duct 33 serves both chambers 21 and 22 of motor 3.

Opened poppet valves 19 allow exhaust liquid to flow to relative liquid tubes 35 and 36 of the motor units. The flow cycle shown by the arrows in the above set forth tubes enables the pressure liquid to shift the pistons until, by action of the cams 25 of the motors, the effective outflow poppet valves 19 are cam released and, closed by their spring and piston action is stopped and the valves 16 and 20 are unseated just before the valves 15—19 close, but flow from the pocket 20' is choked at valve 55 (later described). Control means, later described, and incorporated to serve liquid pressure to the relative poppet chambers and valves (15—16) if it be intended to advance the piston to the left in a second step for more extension of the piston rod, and which means is also effective to serve liquid to the (motor) poppet valve 19 should it be desired to reverse the motion of the piston (of each motor unit); that is move it to the right hand side.

Attention is now directed to means, Fig. 1, which operates trebly—to select the direction of flow of liquid and drive of the motor units 2 and 3; to cause step-by-step action of the motor pistons in one chosen direction; or to cause a step-by-step reverse motion of motor pistons. This means controls both flow of pressure, in either direction to certain poppets of the motor assembly and, concurrently, the exhaust of liquid from any coordinate open and exhausting poppet of the motor unit, and thereon depends which way the connected motor unit or units will be driven.

This selective, control means is a master, multiple, control valve mechanism. It is characterized by a single, oscillative, reciprocating spindle 40, hand or otherwise operated, and having a rigid, radial pin 41, Fig. 2, engaged in a helical cam slot 42 of a barrel 43 which is turnably keyed by a collar 44 in a casing 45 enclosing two sets of valves, soon to be set forth. The collar 44 is a fixed part of a concentric sleeve 46 of the barrel and hence allows rotation of the barrel by and with the shaft 40 after an initial quarter (in this case) turn of the shaft to cause the shaft to slide inward or outward as to the casing 45.

Any suitable means may be provided for temporary retention of the barrel at any angular position to which it may have been turned (clockwise or anti-clockwise) by the selector shaft 40. A simple friction shoe brake 47 is here shown bearing on the barrel.

Fixed on the sleeve 46 is a cam 48 operative on a related set of motor step action controlling poppet valves of substantially the same kind as above set out. The cam 48 is shown as having diametrically opposite high points 49 and 50, and intermediate, opposite low faces 51 and 51x.

In the casing 45 and to one side of the spindle 40 is a pair of chambers 52 and 53 having spring closed poppet valves 54 and 55 to control liquid flow toward pockets 56 and 57 under the valves 54 and 55. These pockets are served by a common duct 58 to a two-way flow tube 59. In the opposite side of the casing 45 is a pair of chambers 60 and 61 having relative spring closed poppet valves 62 and 63 which control flow in pockets 64 and 65 which are connected by a common, two-way duct 66; this being served by a liquid tube 67.

Therefore, the cam 48 concurrently holds open two diametrically opposite valves, as 54—63, Fig. 1, the flow circuit showing that exhaust is taking place at the valve 54 while it is mechanically (cam) held open and pressure is flowing past poppet 62 and will flow past poppet 63 if flow resistance is less than from poppet 62 (due to pipe friction for example). The diametrically opposite valve 63 is also open and fluid may be flowing from pocket 12' to the chamber 12 past port poppet 16 and through lines 13 and 14 to motor cylinder 3. Return fluid enters line 31 and arrives at chambers 21—22 through duct 33. Fluid cannot pass from upper chamber 22 to lower pocket 20' because port is closed by cam free poppet 20 but it can flow past open poppet 19 and thence through lines 35 and 112 to the open poppet 54 of the distributor 45 and out at line 59 to a suitable receiver or reservoir.

The master control spindle 40 is the actuating part of a system of valves which control the direction of flow of pressure liquid in the circuit tubes 59 and 67, which, in the present disclosure, serve a plurality of motor units (2 and 3) by way of a suitable structure including branched junctions.

For clarity, reference is first made to direction of flow only in tubes 59 and 67, and to control this flow the spindle 40 has a coaxial, tandem-cone cam on its far end in the casing 45; the cones extending oppositely from a basal, intermediate cylinder or cam body 72 and which is of a length to push in under the adjacent ends of diametrically opposite poppet rods 73—74 of relative, spring closed poppet valves 75 and 76; the first functioning as a supply, only, and the latter as an exhaust, only. In other words, the function of each poppet valve 75—76 does not alternate as do the functions of the previously described poppet valves.

The camming cylinder 72 is pushed, by function of the helical cam 42 of the barrel 43, from the position shown in Fig. 1, to a rearward, alternate position, Fig. 2, at which place diametrically opposite valve rods 77 and 78 of relative poppet valves 79 and 80 are therefore thrust outwardly; the valve 79 acting to control supply (only) of liquid, and the valve 80 acting for exhaust, only.

The valve 75 works in a constant pressure liquid supply pocket 73' which has a tube connection 90 to the circuit tube 67. The valve 79 works in a constant liquid supply chamber 79' which leads to a supply pocket 77' which has a tube connection 91 to the circuit tube 59. Liquid, at any desired pressure, is supplied constantly to the chambers 75' and 79' by a main or pipe 92.

The exhaust poppet valves 76 and 80 work in respective chambers 76' and 80' which lead to relative pockets 74' and 78' and these latter are connected to a common exhaust line 93. The chamber 76' has a connection 59' to the tube 59.

In Fig. 1 the supply poppet valve 75 is held open by the cam 72 for liquid flow to the feeder 90 and tube 67 to supply motive liquid by way of the master valve 62 to the circuit tube 68 and by valve 63 and circuit tube 63' (see flow arrows). At the same time the cam 72 is holding open the companion (of valve 75) exhaust valve 76 so that exhaust liquid coming by the master valve 54 (now held open) to the tube 59 is passed on to the exhaust line 93. Such position, Fig. 1, of the master cam 72 and of the two valves 75 and 76 will cause the liquid to flow past either or both poppets 62—63 in a circuit past poppets 15 which will drive the motor pistons 4 and 5 in one direction concurrently.

When the pistons by way of their cams 25 have effected closure of the poppets 19 and cut off outflow and opened poppets 20, whose lines 20a lead to tube 53a and the closed poppet 55, the motors are stopped even though the check poppet 54 is still open. A new motor step or action can be again started by turning the crank spindle 40 clockwise one step if the pistons are to further extend their rods 6—6; without axial shift of the feed control cam 72. Step-by-step motor action is had by step-by-step turn of the control spindle 40 so that the master cam 48 acts in regular, successive order around the set of valves 55, 54, 62, 61; the poppets 62—63 acting only to deliver pressure to either or both tubes 68—63' (according to pipe flow resistance) while poppets 54 and 55 act alternately, in cooperation with the alternately-exhausting poppets in the valve 8 to stop the motors at each step when the cam 48 releases the open poppets 54 or 55. These poppets have capacity for alternate use as pressure servers or as exhausters, as will now be described.

Now to secure a reverse operation or stroke of the motor pistons 4 and 5 the spindle 40, Fig. 1, is turned anti-clockwise one step (90°) without turning effect on the braked barrel 43 but with a reaction by which the pin 41 is caused to screw rearward in the cam slot 42, Fig. 2, and therefore shift the spindle 40 and its cam 72 rearward to consequently allow the valves 75 and 76 to close in their chambers, and reversely, to thrust the valves 79 and 80 outwardly and open their pockets 77' and 78'. This position reverses liquid flow from the tube 92 over into the supply pocket 77', Fig. 1, and thence to tube 91 and the tube 59, while, on the contrary, the exhaust valve 80 is now open and the tube 67 is flowing liquid to a tube 67' leading to the exhaust chamber 80'.

In this reversing valve gear liquid flow can only take place at valves that are mechanically opened by the cam 72. All of the other cam operated valves are also liquid pressure operated, as at valve 62, Fig. 1, while the relative valve 63 is cammed open as to duct 66, but flow may or may not run at the valve 62 depending on pipe resistance.

*The pressure operated junction check valve gear*

For the purpose of coordinating the operation of gangs, groups or systems of hydraulic motors controlled by the master or distributor valve assembly, in casing 45, a set of pairs of duplicate junction boxes is introduced between the direction-flow, step-by-step control valves, there being two boxes for each motor unit 2 (3).

Following the pressure flow indicated in Fig. 1, it will be seen that a branch 100 leads from the tube 67 and taps a manifold 101 which serves end chambers 102 and 103 of a junction box 104a and pressure in these chambers acts on cylindric rams 105—106 to, at times, force spring actuated, poppet valves 107 and 108 inwardly into an intermediate, dual flow (pressure or exhaust) space 109 which is tapped directly by the tube 68. These rams are operative to open the relative valves and this permits liquid flow into junction pockets 110 and 111, one having a junction tube 11a to motor 2, and the other having a junction tube 11b to the motor 3.

It will therefore be quickly seen that liquid pressure is concurrently served to this plurality of motors by the box 104a in one direction by way of direction selecting valve 75. A second box 104b, identical with the box 104a, is now serving to exhaust the motors 2 and 3, which are clockwise turning their valve controlling shafts 10, description of the box 104a sufficing for the box 104b, and others as to construction and operation. Pressure may be flowing to the motors by way of the line 63' as above stated.

The flow arrows indicate that the like tubes 35—36 of the motors are exhausting to the box 104b, whose check poppet valves are now in backflow stopping position under action of their mutual springs 107', in the absence of motive liquid pressure in the relative ram chambers. The exhausting liquid from this box 104b flows by way of a tube 112 to the now cam-opened valve 54, flowing thence to the tube 59—59' and out at the cam opened valve 76 to exhaust line 93.

There is a pair of junction boxes for each motor in the system. In the flow circuit shown the boxes 104a and 104b control flow to and from the motors while pressure subsists in the line 67 to effect a left hand drive, in one step, of the pistons. When the cam 48 is turned clockwise one step from the position, in Fig. 1, this closes the poppet 54 serving box 104b and opens the poppet 55 serving the line 53a connecting to a box 104c which has lines 20a to the motors. The lines 63' from the poppet 63 connects to a box 104d from which tubes 112a connect to the pockets 12' of the motors, and this box connects to manifold 101, as does box 104a. The boxes 104d and 104c are served by a manifold to line 59 for action of their end rams (as in box 104a). These several boxes come into reverse flow effect at each setting of the reversing cam when it is shifted either way, and they either serve pressure to or exhaust from the motors.

Therefore, it is seen that it is only necessary, now, to turn the crank spindle 40 a stroke of 90° anti-clockwise (from position Fig. 1) to thereby shift the reversing cam 72 toward the rear and this will close the valves 75 and 76 and open the valves 79 and 80. During the first 90° turn of the spindle 40 in an anticlockwise direction master cam 51 will remain stationary under control of the brake 47. If the spindle is turned 90° more anticlockwise the cam 51 will also turn and thus open poppets 62 and 55 permitting the escape of returning fluid past poppet 62. This will completely reverse the direction of liquid flow in the tubes 67, 68, 112 and 59, and motive liquid will flow to the motor units by way of boxes 104b and 104c and concurrently move their pistons to the right and exhaust will be by way of boxes 104a and 104d; after initial reversing action.

When a step by step piston motion in one direction is required it is only necessary to turn the spindle 40, regardless of the position of the direction flow cam 72—by quarter turns—to successively sweep the cam 48 in its orbit past the related pairs of valves 54—63 and 55—62 to effect the opening of any closed poppet which stops motor exhaust at valve 45 and thereby permit successive impulse flow from poppets 62—63 to the poppet valves 16—15 and thence to the tube 14, ultimately, if left hand piston motion is desired. If right hand piston motion is desired the reverse flow of liquid pressure is fed to the poppets 19 and 20 of the motors by way of service tubes 59, 58, 112, 53a, 35 and 20a, and exhausting from the motor poppets 15, pipes 11b and 68 to poppet 62 which has been cam opened at this time, and thence to conduit 66—67—67'. The rams 105 are slightly larger in diameter than the ports for the check valves 107—108 and this differential insures inward opening of these valves by pressure in chambers 102—103.

What is claimed is:

1. In a hydraulic motor control assembly a valve gear having liquid pressure and liquid exhaust connections and including a plurality of pairs of poppet valves working in respective chambers and controlling respective pockets, each pair of valves having a duct common to and relating its pockets and each duct having its own fluid flow to said connections, said valves being radial and angularly symmetrical on a common center in the gear, springs for closing each of the valves, and a control cam means for concurrently opening given, diametrically paired valves for permitting pressure flow at one open valve and exhaust at the radially opposite valve or contrarywise as desired; the cam being movable step-by-step to the diagonally paired valves, in either direction, the ducts each having a pipe connection for exhaust from or pressure fluid to the pockets of the valves; the first named connections including a two-way flow pipe from each chamber; and means including reversing poppet valves arranged in diametrical pairs as to a common axis, a reciprocative spindle having a cam to act independently on each pair of the reversing valves, a rotative cam mechanism for the said control cam and including a device for reciprocating the spindle when it is rotated as to the said mechanism; said mechanism being rotative by the spindle in either of its shifted positions.

2. In a hydraulic motor control assembly; a motor, a motor valve gear having pressure liquid and liquid exhaust flow connections and including a plurality of pairs of poppet valves working in respective chambers and controlling relative pockets, and a connection conduit common to and connecting given chambers in a pair and respective connection tubes from said conduits to opposite ends of the motor; the valves being openable by pressure in their pockets from the pressure connections and the said valves being radial and in angular symmetrical spacing in the gear on a common axis, springs for normally closing the valves, and a control cam for concurrently opening given, diametrically opposite valves and permitting other thus paired valves to open by liquid pressure or close by spring pressure, whereby the conduit related pairs of the chambers are either serving motive liquid or are at exhaust period as to the said connections, and means connecting the said cam to a moving part of the motor to effect a timing of the valve gear by the motor, and a distributor valve assembly including pairs of normally closed, self-closing valves controlling flow to and from relative pairs of said pockets of the motor valve gear, and a device for timely actuating the distributing valves to control flow to and from the motor valve gear.

3. In a motor and hydraulic control apparatus; a hydraulic motor and a valve system driven thereby for step-by-step motor action in either direction of drive, a master control valve assembly connected to and for liquid supply to and exhaust from the said system and having service connections, and a reversing valve set attaching to said connections for alternating direction of flow therein for motor drive in either direction at any motor step.

4. The apparatus of claim 3, and a control mechanism common to and for selectively actuating either the master valve assembly or the reversing set at will at any motor step.

5. The apparatus of claim 3, said assembly and said set each having a plurality of pairs of valve elements, a rotative cam for the assembly valves and a reciprocative cam for the reversing set valves, and an operating spindle common to the cams.

6. A hydraulic motor system including a plurality of piston motors, and means for controlling fluid pressure flow to and exhaust from the motors and for preventing the exhaust from one motor reacting on the other; said means including check valve units in pairs for each motor, each unit having a two-way flow chamber and a flow conduit therefor, a pair of pockets communicating with said chamber and each having a flow conduit to lead motor exhaust to the chamber, and self-closing valves operative to close the pocket having the lower exhaust pressure to prevent back flow thereto from the higher pressure pocket.

7. In a hydraulic motor apparatus; a hydraulic motor, a valve system having a plurality of diametrically opposite spring closed valve members disposed in a circle and each serving a chamber and a pocket, flow lines from the motor having ducts to given pairs of the valve chambers and serving the motor, separate flow lines to the valve pockets, and a rotary cam device driven by the motor and acting to engage and shift a coordinate pair of said diametrically opposite valve members of the system for pressure to and exhaust from the motor; and a distributing and exhausting valve gear having pairs of diametrically opposed valves which severally control flow to and from the said system pockets, and control means for opening one of the valves of a pair of said gear while the other thereof is closed.

8. In a hydraulic motor apparatus; a hydraulic motor, a valve system having valve chambers connected by ducts in pairs and a flow connection from each duct to respective opposite sides of the motor and pockets for each chamber, and diametrical pairs of self-closing poppets closing chambers from relative pockets, separate flow lines from the pockets, and means synchronized with and driven by the motor for concurrently opening the valves of one or another of said pairs; and a distributing valve gear having duct connected pockets, spring closed valves normally closing the pockets, chambers to which the valves open and which severally connect to said first named pockets, and a device acting to engage and open, in time, a coordinate pair of the valves to control flow to and exhaust from said first named pockets of said valve system.

9. In a hydraulic motor apparatus; a hydraulic motor, a valve system having a plurality of spring closed valves disposed in a circle and each serving a chamber and a pocket, flow lines from the motor having ducts to given pairs of the valve chambers and serving the motor, separate flow lines to the valve pockets, and a rotary cam device driven by the motor for actuating valves of a coordinate pair; and a distributing valve gear having duct connected pockets, spring closed valves normally closing the pockets, chambers to which the valves open and which severally connect to the first named system pockets, a device acting, in time, on a coordinate pair of the valves to control flow in said system, and a reversible fluid supply and exhaust valve gear connected to the ducts of the said pockets and including means to effect flow through the distributing gear in either of selective directions, at any position of the motor piston.

10. In a hydraulic valve gear, a distributing valve set having pockets with control members, and a supply and exhaust gear having a plurality of supply valves and a plurality of exhaust valves, flow lines connecting the pairs of control pockets to relative supply valves, and the exhaust valves being connected to said flow lines, and a rotative and slidable control spindle, a cam rotative by and mounted independently of the spindle to open the said control members and a cam reciprocable by and fixed on the spindle to open said valves, one exhaust and one supply set at a time whereby to determine direction of supply and exhaust flow at any setting of the distributing valve.

11. The gear of claim 10; and each cam operable independently of the other by the spindle; the rotative cam including a device to reciprocate the spindle during a rotary motion of the spindle.

12. In a multiple motor, hydraulic control; an exhaust control means for the motors including a pair of valve devices for each motor, each device having a central, two-way flow chamber, a two-way conduit for said chamber, self-closing check valves opening into each chamber, end chambers in said device having pressure supply pipes, pockets closable by the valves between the central and the end chambers and conduits from each pocket to a respective motor, and rams operative by pressure in the end chambers to concurrently open said valves, at times, for pressure flow from the central chamber to the pockets; the check valves, in exhaust period, acting automatically to prevent interflow of exhaust from motor to motor.

13. The control of claim 12; said valves being operable independently by pressure on either that is greater than in its related pocket.

14. The control of claim 12; said devices being coupled in pairs by conduits joining end chambers of given devices for reversing function of the motors.

HERBERT R. SANDERS.

REFERENCES CITED

The following references are of record in the file of this patent:

UNITED STATES PATENTS

| Number | Name | Date |
|---|---|---|
| 1,231,257 | Herr | June 26, 1917 |
| 1,841,629 | Pigeolet | Jan. 19, 1932 |
| 1,877,763 | Hazard | Sept. 20, 1932 |
| 1,955,154 | Temple | Apr. 17, 1934 |
| 2,274,527 | Buran | Feb. 24, 1942 |
| 2,275,963 | Herman | Mar. 10, 1942 |
| 2,293,555 | Mercier | Aug. 18, 1942 |
| 2,300,112 | Ellinwood | Oct. 27, 1942 |
| 2,349,641 | Tucker | May 23, 1944 |
| 2,365,748 | Curtis | Dec. 26, 1944 |
| 2,376,320 | Butrovich | May 22, 1945 |
| 2,380,973 | Kopp | Aug. 7, 1945 |
| 2,387,007 | Buchanan | Oct. 16, 1945 |